Aug. 3, 1965 R. E. V. RAMSING 3,198,373
ELECTRICAL DEVICE COVER PLATE SEAL
Filed June 8, 1964
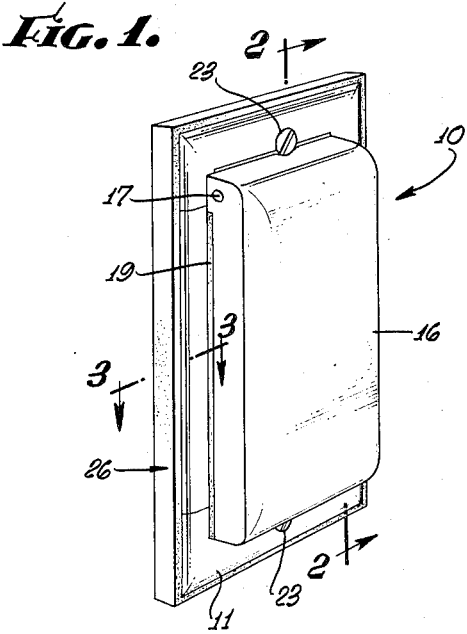
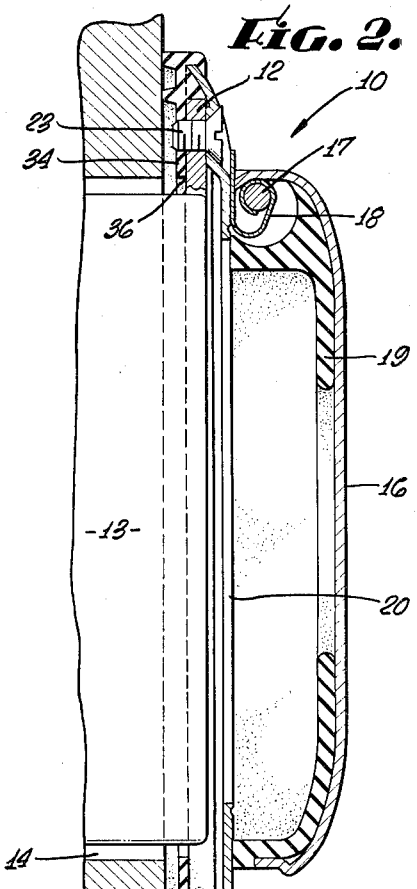
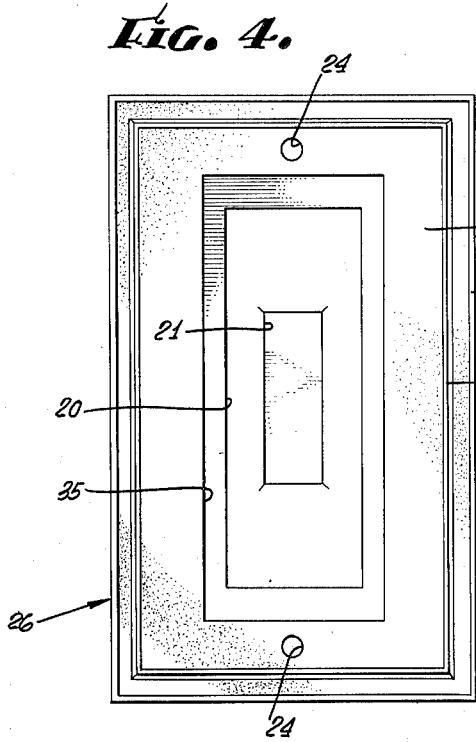
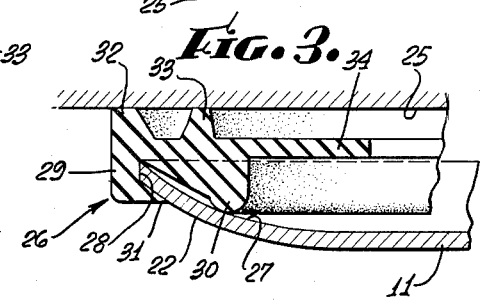
INVENTOR.
ROBERT E. V. RAMSING
BY White & Haefliger
ATTORNEYS 3,198,373
ELECTRICAL DEVICE COVER PLATE SEAL
Robert E. V. Ramsing, Whittier, Calif., assignor to Sierra Electric Corporation, Gardena, Calif., a corporation of California
Filed June 8, 1964, Ser. No. 373,403
6 Claims. (Cl. 220—24.3)

This invention has to do with an improved dual seal for maintaining moisture tight engagement of an electrical device cover plate with a mounting surface to which it is applied. Such plates may be apertured to receive or permit access to an electrical device as a switch or plug receptacle, and may be equipped with a cover itself sealed about the plate aperture.

More particularly the invention relates to such cover plates which are peripherally flanged toward the mounting surface, and to an improved sealing gasket so associated with the cover and its flange as to present an outer sealing rib or ridge which seals against the mounting surface at the outside of the flange, and an inner rib or seal which seals at the inside of the flange with moisture-proof tightness by reason of a novel inside configuration given the gasket to assure sustained compression of the last mentioned rib or ridge by cover applied force.

Such sealing relation of the gasket and cover is achieved to particular advantage using a cover having a rectangularly continuous, transversely curved flange received at the inside of a peripheral gasket lip which also forms the outer seal, the gasket having an inside rib which engages against the inside concave surface of the flange so that as the plate is tightened toward the mounting surface, the inside rib transmits the cover pressure to the sealing ridge associated therewith, thus to maintain a secondary seal assured against moisture passage by reason of its sustained compression.

The various features and details of an illustrative embodiment of the invention will be apparent from the following description of the accompanying drawing, in which:

FIG. 1 is a view showing in perspective the cover plate assembly with peripheral seal;

FIG. 2 is an enlarged vertical cross section taken on broken line 2—2 of FIG. 1;

FIG. 3 is a fragmentary enlarged section taken on line 3—3 of FIG. 1; and

FIG. 4 is an enlarged rear view of FIG. 1 showing gasket configurations in elevation.

Referring first to FIG. 2, the cover plate assembly generally indicated at 10 is shown to comprise a base cover plate 11 adapted for attachment to lugs 12 of an electrical device 13 such as a receptacle or switch received for example within opening 14 in a wall 15. The assembly 10 is shown to include also a sealed access cover 16, constituting in itself no part of the present invention other than its presence in a typical embodiment, pivotally mounted by hinge pin 17 to the base plate 11 to open outwardly against the resistance of spring 18, as for example according to the hinge structure particularly dealt with in my co-pending application Serial No. 332,715, filed on December 23, 1963. For present purposes, it will suffice to characterize the cover 16 as having the illustrated concave configuration and to contain a rubber gasket 19 engaging the surface of plate 11 to form a continuous moisture-tight seal about rectangular access opening 20 in the plate. Where the device 13 is a switch, its handle (not shown) may project outwardly through the opening 20 opposite the central cover gasket interruption 21.

In more particular reference to the base plate 11, the latter is shown to have a peripheral flange 22 mounted to lugs 12 by screws 23 inserted through openings 24 in the later described inner gasket flange, the base plate flange also being mounted to the wall surface 25 through the intermediary of a rectangular sealing gasket generally indicated at 26. The plate flange 22 has continuously about its plate the curved configuration appearing in FIG. 3, presenting a concave surface 27 functionally related to the configuration of gasket 26 in assuring maintenance of a moisture tight seal between the plate periphery and surface 25.

The gasket 26 is shown to have at its inside a groove 28 receiving the edge of the flange 22 and formed between an inner (in the sense of being away from the wall surface 25) peripheral lip 29 of the gasket and a spaced parallel rib 30 engaged against the concave surface 27. As illustrated, the outer plate surface is peripherally and continuously overlapped by the lip projection 31.

The outer face of the gasket is formed to present a first peripheral sealing ridge projection 32 of the lip 29 and a second parallel sealing ridge 33 in compressive force receiving relation with the plate-engaging rib 30 inwardly of the flange edge. Thus interengagement of the first ridge projection 32 with surface 25 maintains a primary seal about the plate interior and opening 14, and the secondary seal is maintained by engagement of ridge 33 against the wall surface, the resulting seal having particularly assured tightness by reason of the fact that the pressure of flange 22 against rib 30 is transmitted thereby through the gasket to compress ridge 33 tightly against the wall surface. Preferably, rib 30 is relatively wider to assure the force distribution within the body of the gasket and to the narrower ridge 33.

The gasket 26 is shown also to have a flexible flange 34 projecting into the inside of the plate to continuously define the gasket opening 35. As will be apparent from FIG. 2, the rib 30 is interrupted to accommodate the mounting lugs 12, thus to permit the gasket flange 34 to overlap and engage flatly against the lug surfaces 36.

The gasket 26 is made of rubber or other compressible material, to have compressibility in its sealing ridges and against the wall surface, and also to have such flexibility and elasticity as to be easily applicable to the cover plate flange 22 in the relationship described.

I claim:
1. The combination comprising an apertured plate mountable to a surface about an electrical device and having a peripheral flange deflected from the plane of the plate to extend toward said surface, and a yieldable gasket having at its inside a groove receiving the edge of said flange and formed between an inner peripheral lip of the gasket overlapping the outer surface of the plate and a spaced parallel gasket rib engaged against the inside of the plate, the outer face of the gasket being formed to present a first peripheral sealing ridge projection of said lip and a second spaced parallel sealing ridge in pressure receiving relation with said plate-engaging rib inwardly of the flange edge so that plate pressure against the gasket applied to said surface resiliently engages said first ridge against the surface and compresses said second ridge against the surface by force transmission from the plate through said rib.

2. The combination of claim 1, in which said force transmitting rib is substantially wider than said second sealing ridge.

3. The combination of claim 1, in which said flange is of rectangular transversely curved shape and said rib bears against the inner concave surface of the flange.

4. The combination of claim 3, in which said gasket is made of an elastomer and each of said lip, rib and ridges is continuously rectangular.

5. The combination of claim 1, in which the gasket has a flexible flange projecting toward the interior of the plate.

6. The combination of claim 5, in which said plate engaging rib has interruptions to receive mounting lugs overlapped by said flexible flange at the location of fastener openings in the plate and flexible flange.

References Cited by the Examiner

UNITED STATES PATENTS

| 2,985,334 | 5/61 | Slater | 220—24.3 |
| 2,997,520 | 8/61 | Kinsman | 220—24.3 |

THERON E. CONDON, *Primary Examiner.*